(12) United States Patent
Yamashina

(10) Patent No.: US 9,247,099 B2
(45) Date of Patent: Jan. 26, 2016

(54) IMAGE FILE EDITING APPARATUS AND METHOD, AND PROGRAM

(75) Inventor: Saneyuki Yamashina, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 1163 days.

(21) Appl. No.: 12/416,317

(22) Filed: Apr. 1, 2009

(65) Prior Publication Data

US 2009/0245666 A1    Oct. 1, 2009

(30) Foreign Application Priority Data

Apr. 1, 2008 (JP) ................. 2008-095330

(51) Int. Cl.
| | |
|---|---|
| G06K 9/46 | (2006.01) |
| H04N 1/21 | (2006.01) |
| H04N 1/00 | (2006.01) |
| H04N 19/12 | (2014.01) |
| H04N 19/17 | (2014.01) |
| H04N 101/00 | (2006.01) |

(52) U.S. Cl.
CPC ......... *H04N 1/2166* (2013.01); *H04N 1/00442* (2013.01); *H04N 1/00453* (2013.01); *H04N 1/00461* (2013.01); *H04N 1/00474* (2013.01); *H04N 1/215* (2013.01); *H04N 19/12* (2014.11); *H04N 19/17* (2014.11); *H04N 2101/00* (2013.01); *H04N 2201/212* (2013.01); *H04N 2201/3226* (2013.01); *H04N 2201/3273* (2013.01)

(58) Field of Classification Search
CPC .......... H04N 1/00442; H04N 1/00453; H04N 1/00461; H04N 1/00474; H04N 1/215; H04N 1/2166; H04N 19/12; H04N 19/17; H04N 2101/00; H04N 2201/212; H04N 2201/3226; H04N 2201/3273
USPC .......... 382/243, 176, 164, 33, 171, 168, 232, 382/233, 234, 235; 709/246, 200–205, 709/217–227

See application file for complete search history.

(56) References Cited

U.S. PATENT DOCUMENTS

| | | | | |
|---|---|---|---|---|
| 5,392,362 | A * | 2/1995 | Kimura et al. | 382/176 |
| 6,792,153 | B1 * | 9/2004 | Tsujii | 382/239 |
| 6,996,269 | B2 * | 2/2006 | Ogawa et al. | 382/166 |
| 7,111,045 | B2 * | 9/2006 | Kato et al. | 709/205 |
| 7,133,565 | B2 * | 11/2006 | Toda et al. | 382/243 |
| 7,865,023 | B2 * | 1/2011 | Takahashi | 382/232 |
| 8,044,961 | B2 * | 10/2011 | Opstad et al. | 345/467 |

(Continued)

FOREIGN PATENT DOCUMENTS

| | | | | |
|---|---|---|---|---|
| JP | 2003018462 A | * | 1/2003 | H04N 5/27 |
| JP | 2004194146 A | * | 7/2004 | H04N 5/91 |
| JP | 2003018462 | * | 1/2007 | H04N 5/278 |

*Primary Examiner* — Mekonen Bekele

(74) *Attorney, Agent, or Firm* — Canon U.S.A., Inc. IP Division

(57) ABSTRACT

An image file editing method includes an analysis step of analyzing a compression format of each of a plurality of images included in a plurality of image files, a display step of displaying analysis results together with thumbnail images each of which corresponds to one of the plurality of images, a selection step of selecting images based on the thumbnail images, a determination step of determining, based on the results obtained in the analysis step, whether or not a compression format of each selected image is changeable, a compression step of applying a changed compression format, and an output step of collectively outputting selected images as a single image file.

20 Claims, 8 Drawing Sheets

(56) References Cited

U.S. PATENT DOCUMENTS

| | | | |
|---|---|---|---|
| 2001/0000710 A1* | 5/2001 | Queiroz | G06K 9/00456 382/264 |
| 2004/0068583 A1* | 4/2004 | Monroe et al. | 709/246 |
| 2004/0220962 A1* | 11/2004 | Kaneda | 707/102 |
| 2005/0100212 A1* | 5/2005 | Eguchi et al. | 382/164 |
| 2005/0238240 A1* | 10/2005 | Sakai et al. | 382/232 |
| 2005/0238255 A1* | 10/2005 | Niwa | H04N 21/234363 382/305 |
| 2006/0012833 A1* | 1/2006 | Ito et al. | 358/400 |
| 2006/0044601 A1* | 3/2006 | Misawa | G06F 3/122 358/1.15 |
| 2007/0097403 A1* | 5/2007 | Miyazawa | H04N 1/3871 358/1.13 |
| 2008/0037073 A1* | 2/2008 | Fujimoto | 358/471 |
| 2009/0141048 A1* | 6/2009 | Fujimoto et al. | 345/673 |

* cited by examiner

| EDIT | | | | |
|---|---|---|---|---|
| REARRANGEMENT OF PAGES [<] [<] [>] [>] | Sea FIRST PAGE | Sea SECOND PAGE | Sea THIRD PAGE | Mountain FIRST PAGE |
| DELETE SELECTED PAGE | FIRST PAGE | SECOND PAGE | THIRD PAGE | FOURTH PAGE |
| ADD PAGE | Mountain SECOND PAGE | Mountain THIRD PAGE | | |
| UNDO | "H" FIFTH PAGE "T" | "H" SIXTH PAGE | | |
| RETURN TO INITIAL STATE | | | | |
| SAVE SELECTED PAGE ONLY | | | | |
| SAVE ALL PAGES | | | | |
| END | SETTING... | | | |

12 — REARRANGEMENT OF PAGES
13 — DELETE SELECTED PAGE
14 — ADD PAGE
15 — UNDO
16 — RETURN TO INITIAL STATE
17 — SAVE SELECTED PAGE ONLY
18 — SAVE ALL PAGES
19 — END
10 — SETTING...
11

IMAGE FILE EDITING APPARATUS AND METHOD, AND PROGRAM

BACKGROUND OF THE INVENTION

1. Field of the Invention

The present invention relates to a technique for compressing and editing image data files.

2. Description of the Related Art

One of known techniques for separating multi-valued document image data into image areas and compressing the image areas is to separate a document image into a character portion and a figure portion and compress the character portion and the figure portion using the modified read (MMR) and Joint Photographic Experts Group (JPEG) formats, respectively.

However, it is difficult to reconstruct image files, once created, using image objects having different compression formats. Thus, for example, if a plurality of image files are combined to create a single image file, there is a problem in that the file size of a multipage image file created by combining files becomes too large depending on the number of files combined or the file size of each file.

Further, in general, in a situation where multipage image files such as Portable Document Format (PDF) files, lossy compressed files such as JPEG files, and uncompressed files such as Tagged Image File Format (TIFF) files exist, each image file or page is separated into a character region and a background region. In this case, it is not possible to reconstruct image files using image objects having different compression formats and combine the files to create a multipage image file.

Further, as known in the art, a method of displaying, in a thumbnail image, information indicating whether or not an image file has text data added thereto to allow a user to easily recognize attribute is implemented as software. However, information indicating whether or not a character region and a background region, which are separated from each other, are composed of image objects having different compression formats is not displayed. Thus, a problem occurs in that a user is not able to easily recognize the compression state of images.

SUMMARY OF THE INVENTION

The present invention provides an image file editing method including an input step of receiving a plurality of image files; an analysis step of analyzing a compression format of each of a plurality of images included in the plurality of image files; a display step of displaying a list of thumbnail images each of which corresponds to one of the plurality of images and displaying analysis results obtained in the analysis step together with the thumbnail images; a selection step of selecting images from among the plurality of images displayed in the display step; a determination step of determining, based on the results obtained in the analysis step, whether or not each image selected in the selection step is modifiable to have a compression format in which a first compression format is used for a first image region and a second compression format different from the first compression format is used for a second image region when the image includes the second image region; a compression step of compressing, using the compression format, an image that is determined in the determination step to be modifiable to have the compression format; and an output step of collectively outputting a plurality of images selected in the selection step as a single image file so that the single image file includes an image that is not compressed using the compression format in the compression step and an image compressed using the compression format in the compression step.

Further features of the present invention will become apparent from the following description of exemplary embodiments with reference to the attached drawings.

BRIEF DESCRIPTION OF THE DRAWINGS

FIG. 2 is a diagram illustrating a window displayed in the first exemplary embodiment.

DESCRIPTION OF THE EMBODIMENTS

First Exemplary Embodiment

Figure 1:
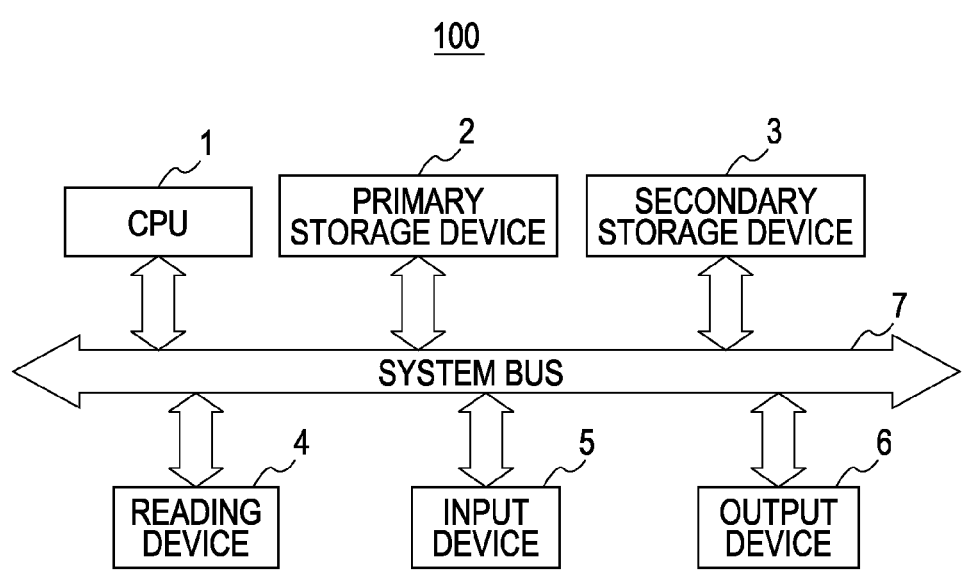
FIG. 1 is a schematic diagram illustrating a structure of an editing apparatus according to a first exemplary embodiment of the present invention.

FIG. 1 is a schematic diagram illustrating a structure of an editing apparatus 100 for editing an image file according to a first exemplary embodiment of the present invention.

The editing apparatus 100 includes a central processing unit (CPU) 1, a primary storage device 2, a secondary storage device 3, a reading device 4, an input device 5, an output device 6, and a system bus 7.

The CPU 1 is configured to compute, determine, and control data or instructions to perform processes such as executing a program stored in the primary storage device 2. The primary storage device 2 is mainly a memory and is configured to load and store a program or the like stored in the secondary storage device 3.

The secondary storage device 3 may be a hard disk or the like. In the first exemplary embodiment, a program is stored in the secondary storage device 3, and is loaded into the primary storage device 2 when the program is executed. Then, the program is executed by the CPU 1.

The reading device 4 may be, for example, a scanner. The input device 5 may be, for example, a mouse or a keyboard, or may be a controller. The output device 6 may be, for example, a display. The system bus 7 is a transmission line through which instructions or data may be transferred between the CPU 1 and the reading device 4, the input device 5, the output device 6, or the storage device 2 or 3.

The input device 5 may implement an input step of receiving a plurality of image files.

FIG. 2 is a diagram illustrating a window WD1 displayed when a page in a multipage image file is edited or the image file is saved on an application used in the first exemplary embodiment.

The window WD1 contains a thumbnail display region 11, "rearrangement of pages" buttons 12, a "delete selected page" button 13, an "add page" button 14, an "undo" button 15, and a "return to initial state" button 16. The window WD1 further contains a "save selected page only" button 17, a "save all pages" button 18, an "end" button 19, and a "setting" button 10.

After files to be edited are displayed using thumbnails, a user selects a page to be moved or deleted, and executes an operation such as rearranging pages or deleting or inserting a page through an editing section 33 described below.

After editing a page, the user clicks the "save selected page only" button 17 or the "save all pages" button 18.

Figure 3:
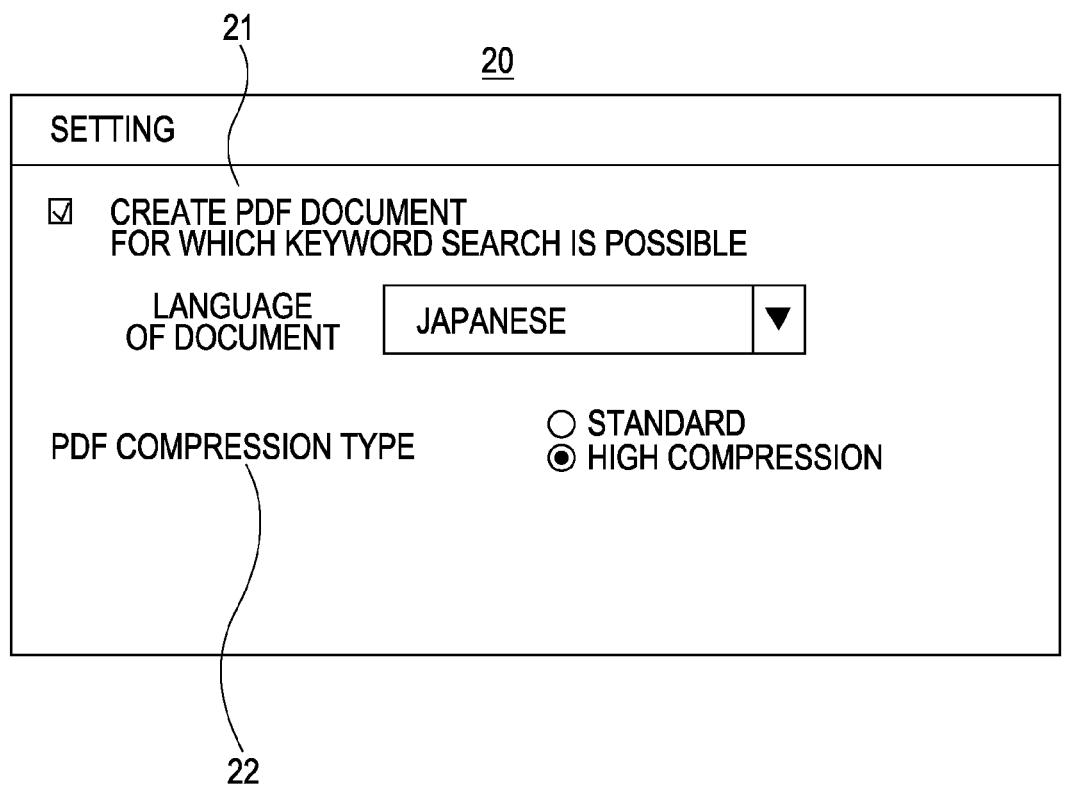
FIG. 3 is a diagram illustrating an example of a setting screen.

FIG. 3 is a diagram illustrating an example of a setting screen 20.

The setting screen 20 contains an additional text setting portion 21 and a file compression type 22.

When the save button 17 or 18 is clicked, the image files are saved in the secondary storage device 3 according to the setting content set on the setting screen 20 illustrated in FIG. 3.

Figure 4:
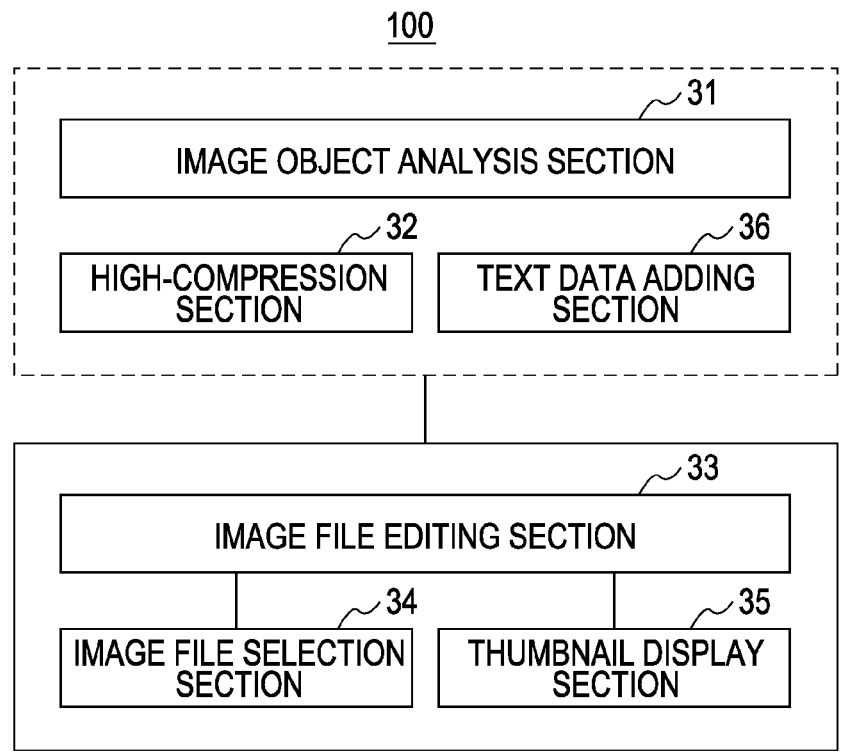
FIG. 4 is a block diagram of the editing apparatus.

FIG. 4 is a block diagram of the editing apparatus 100.

The editing apparatus 100 includes an image object analysis section 31, a high-compression section 32, the editing section 33, a selection section 34, a thumbnail display section 35, and a text data adding section 36.

The selection section 34 opens single-page or multipage image files to be edited through the window WD1.

The thumbnail display section 35 displays, for each page of the files opened, a thumbnail image corresponding to the page in the thumbnail display region 11.

Page editing buttons are arranged in the left region of the window WD1. The "rearrangement of pages" buttons 12 are buttons used to move a page currently selected by the editing section 33. The "delete selected page" button 13 is a button used to delete a page currently selected by the editing section 33.

The "add page" button 14 is a button used to display a new image file opened by the selection section 34 at the end of the thumbnail display region 11 in the window WD1.

The "undo" button 15 is a button used to return the current state of the page editing operation being performed by the editing section 33 to the previous state.

The "return to initial state" button 16 is a button used to return the page editing operation being performed by the editing section 33 to the initial state.

The "save selected page only" button 17 is a button used to save the currently selected page as a page in a multipage file.

The "save all pages" button 18 is a button used to save all pages currently displayed as thumbnails as pages in a multipage file.

The "end" button 19 is a button used to terminate the editing operation and to close the window WD1.

The "setting" button 10 is a button used to display a dialog (setting screen 20) illustrated in FIG. 3 for setting a file attribute at the time of saving a file.

Files to be edited are displayed using thumbnails. Then, a page to be moved or deleted is selected, and an operation such as rearranging pages or deleting or inserting a page is performed through the editing section 33.

When the "save selected page only" button 17 or the "save all pages" button 18 is clicked after a page is edited, an image file saving section included in the application saves the image files according to the setting content set on the setting screen 20 illustrated in FIG. 3.

The image object analysis section 31 is configured to implement an analysis step of analyzing a first compression format in which individual images of the plurality of image files are compressed.

The high-compression section 32 is configured, by way of example, to implement a compression step of performing compression using a second compression format different from the analyzed first compression format when the compression format to be used for each of the images can be changed to the second compression format as a result of the analysis in the analysis step.

The output device 6 is an exemplary device configured to output, as one image file, a plurality of image files including images compressed using the first and second compression formats, where images other than images compressed using the first compression format among the images of the plurality of image files are compressed using the second compression format.

Figure 5:
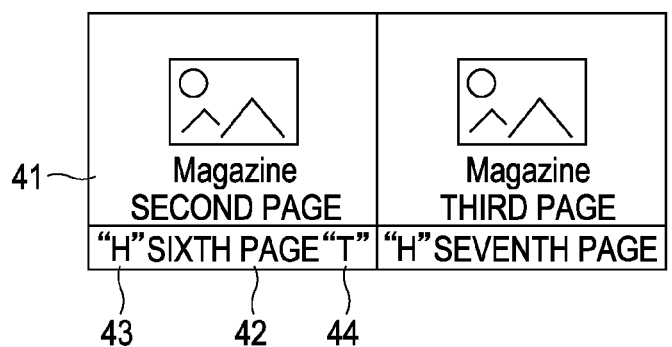
FIG. 5 is a diagram illustrating an enlarged version of thumbnails in a thumbnail display region.

FIG. 5 is a diagram illustrating an enlarged version of thumbnails in the thumbnail display region 11.

A file name display portion 41 is provided below each of the thumbnails, where a file name and a page number in the original file are displayed. A page number display portion 42 is further provided in which a page number in a multipage image file to be saved after editing is displayed in addition to the page in the original file.

In the first exemplary embodiment, the first through third pages are included in a multipage image file with the file name "Sea", and the fourth through sixth pages are included in a multipage image file with the file name "Mountain". A plurality of image files may not necessarily be edited but a single multipage image file or a single single-page image file may be edited.

The image object analysis section 31 further analyzes whether or not a character region and a background region, which are separated from each other, are composed of image objects having different compression formats. Then, a thumbnail of a page in which a character region and a background region are separated from each other and are composed of image objects having different compression formats is displayed with a mark "H" in an information display portion 43. A thumbnail of a page with text added thereto is displayed with a mark "T" in an additional text information display portion 44.

Figure 6:
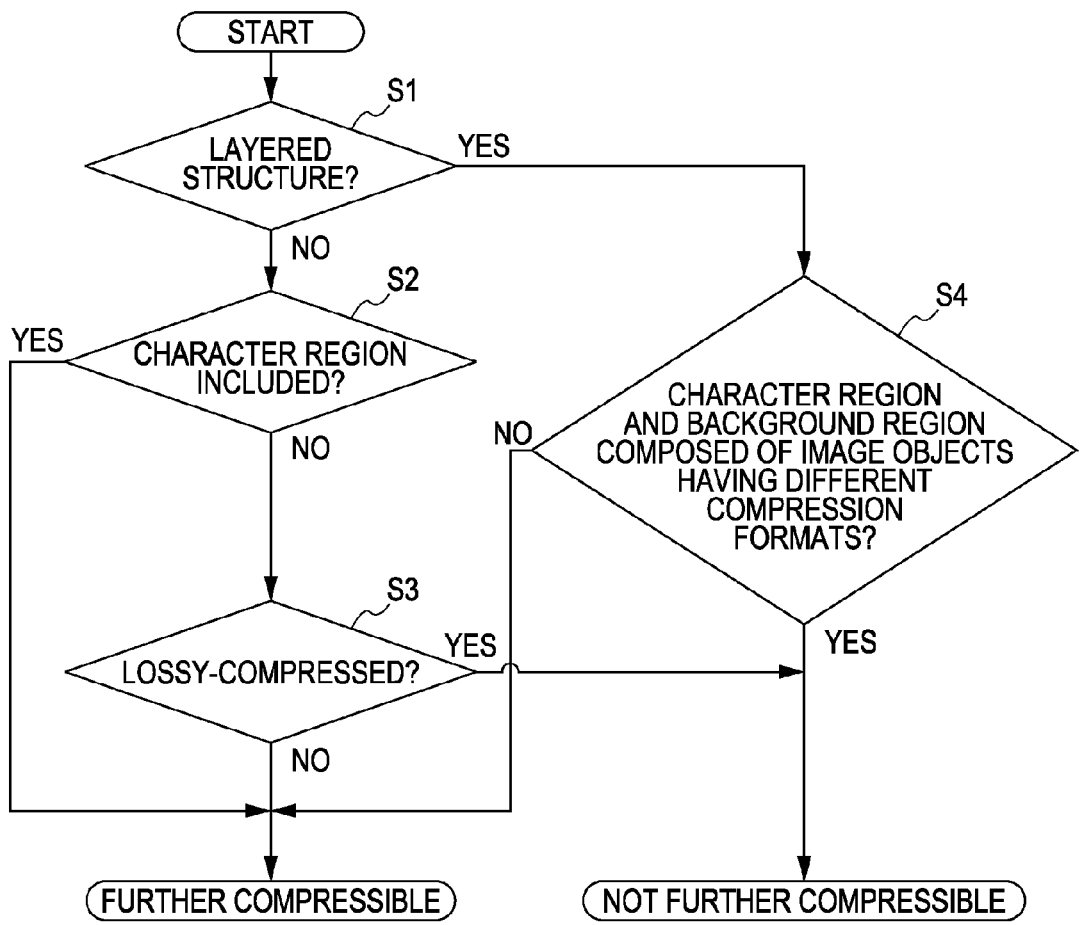
FIG. 6 is a flowchart illustrating a detection process performed by an image object analysis section according to the first exemplary embodiment.

FIG. 6 is a flowchart illustrating an operation of the image object analysis section 31 for detecting an image in which a character region and a background region are separated from each other and are composed of image objects having different compression formats according to the first exemplary embodiment.

First, it is determined whether or not a given image has a layered structure (step S1). If the image has a layered structure, the image object analysis section 31 analyzes whether or not a character region and a background region are composed of image objects having different compression formats. If the character region and the background region are composed of image objects having different compression formats (YES in step S4), it is determined that the image is not further compressible. If the character region and the background region are not composed of image objects having different compression formats (NO in step S4), the image may be compressible and it is determined that the image is further compressible.

Next, an image having no layered structure (NO in step S1) is analyzed by a character region detection unit 61 described below to determine whether or not the image includes a character region.

If the image includes a character region, it is determined that the image is further compressible (YES in step S2). Even if the image includes no character region, it is determined that the image is further compressible when the image is not a lossy compressed image (NO in step S3).

Conversely, if the image includes no character region and is a lossy compressed image, it is determined that the image is not further compressible. Thus, the user can easily check the file attribute for every page.

Figure 7:
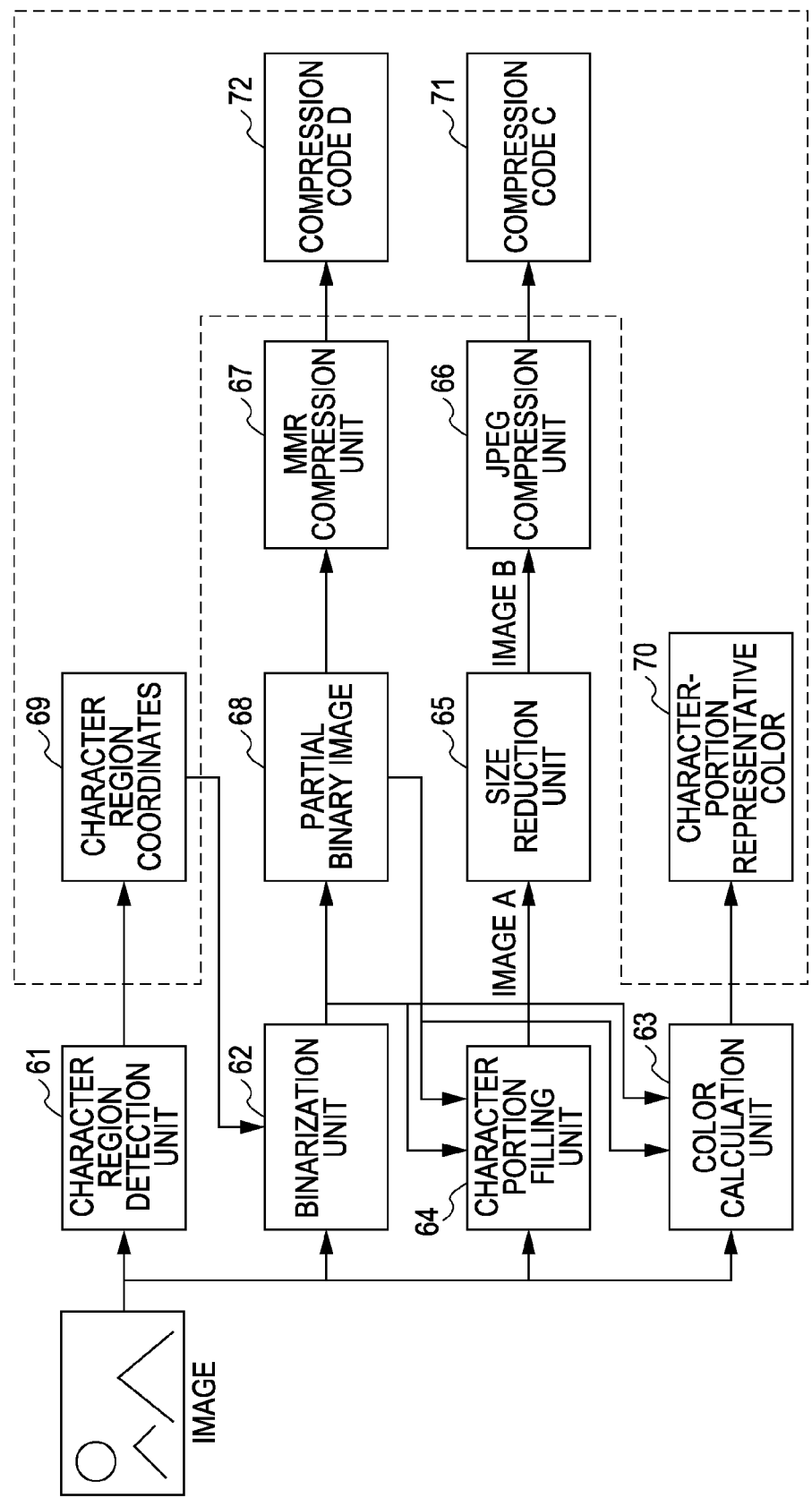
FIG. 7 is a block diagram of a high-compression section.

FIG. 7 is a block diagram of the high-compression section 32 configured to separate a character region and a background region and to perform reconstruction using image objects having different image depths, resolutions, and compression formats.

The high-compression section 32 includes the character region detection unit 61, a binarization unit 62, a color calculation unit 63, a character portion filling unit 64, a size reduction unit 65, a JPEG compression unit 66, an MMR compression unit 67, and a binary image 68 corresponding to a character region portion in an original image. Further, the high-compression section 32 finally includes character region coordinates 69, a character-portion representative color 70, a compression code C 71, and a plurality of compression codes D 72.

The character region detection unit 61 detects a character region from an input original image, and creates a plurality of character region coordinates 69. The binarization unit 62 receives the character region coordinates 69, and creates a binary image 68 corresponding to the character region in the original image. The color calculation unit 63 refers to the black portion of the binary image 68 and the original image to calculate a character-portion representative color 70 of the black portion.

The character portion filling unit 64 extracts this binary image (black) region from the original image, and creates an image A filled with a surrounding color. The size reduction unit 65 receives the image A, and reduces the size of the image A to create an image B. The JPEG compression unit 66 receives the image B, and compresses the image B using a JPEG technique to create a compression code C 71. The MMR compression unit 67 receives the plurality of binary images described above, and compresses the plurality of binary images using MMR to create a plurality of compression codes D 72.

The four data items, namely, the character region coordinates 69, the character-portion representative color 70, the compression code C 71, and the compression codes D 72, are finally combined to produce compressed data. Thus, an image in which characters are overlaid on the background can be produced and displayed as an image perceived to be similar to the original image.

JPEG compression does not provide high compression efficiency for an image with abrupt changes in pixel value. However, changes in pixel value in a character portion can be prevented by removing the character portion from the image in the process described above. Thus, improved compression efficiency can be achieved. Further, in a file with text data added thereto, a character region has been detected when the text data is added. Since the character region coordinates 69 are held when the high-compression section 32 separates the file into the character region and the background region, the information regarding the character region coordinates 69 is used as information regarding the separated character region without detecting a new character region.

Therefore, the accuracy of analyzing a character region can be improved in an original image file compressed using JPEG compression or the like.

Next, a file saving operation will be described.

Figure 8:
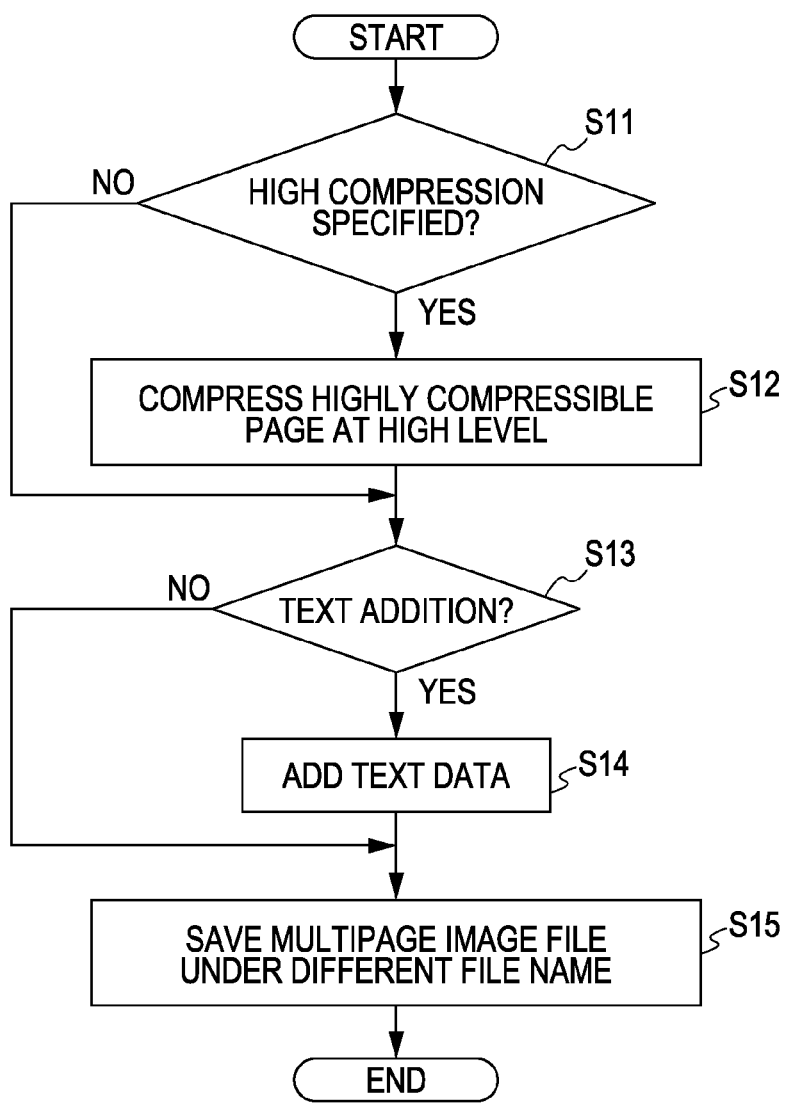
FIG. 8 is a flowchart illustrating a file saving process.

FIG. 8 is a flowchart illustrating a file saving operation.

If high compression is set in the file compression type 22 on the setting screen 20 (YES in step S11), a file which is further compressible is processed as follows: the high-compression section 32 separates a character region and a background region and performs reconstruction using image objects in different layers and having different resolutions and compression formats (step S12).

If the addition of text is set in the additional text setting portion 21 on the setting screen 20 illustrated in FIG. 3 (YES in step S13), an optical character recognition (OCR) process is performed on a page having no text data added thereto and text data is added (step S14).

Finally, the "save selected page only" button 17 or the "save all pages" button 18 is clicked to thereby create a multipage image file, and the multipage image file is saved under a different file name (step S15). The original file target for page editing remains unchanged without being edited or the like.

Figure 9:
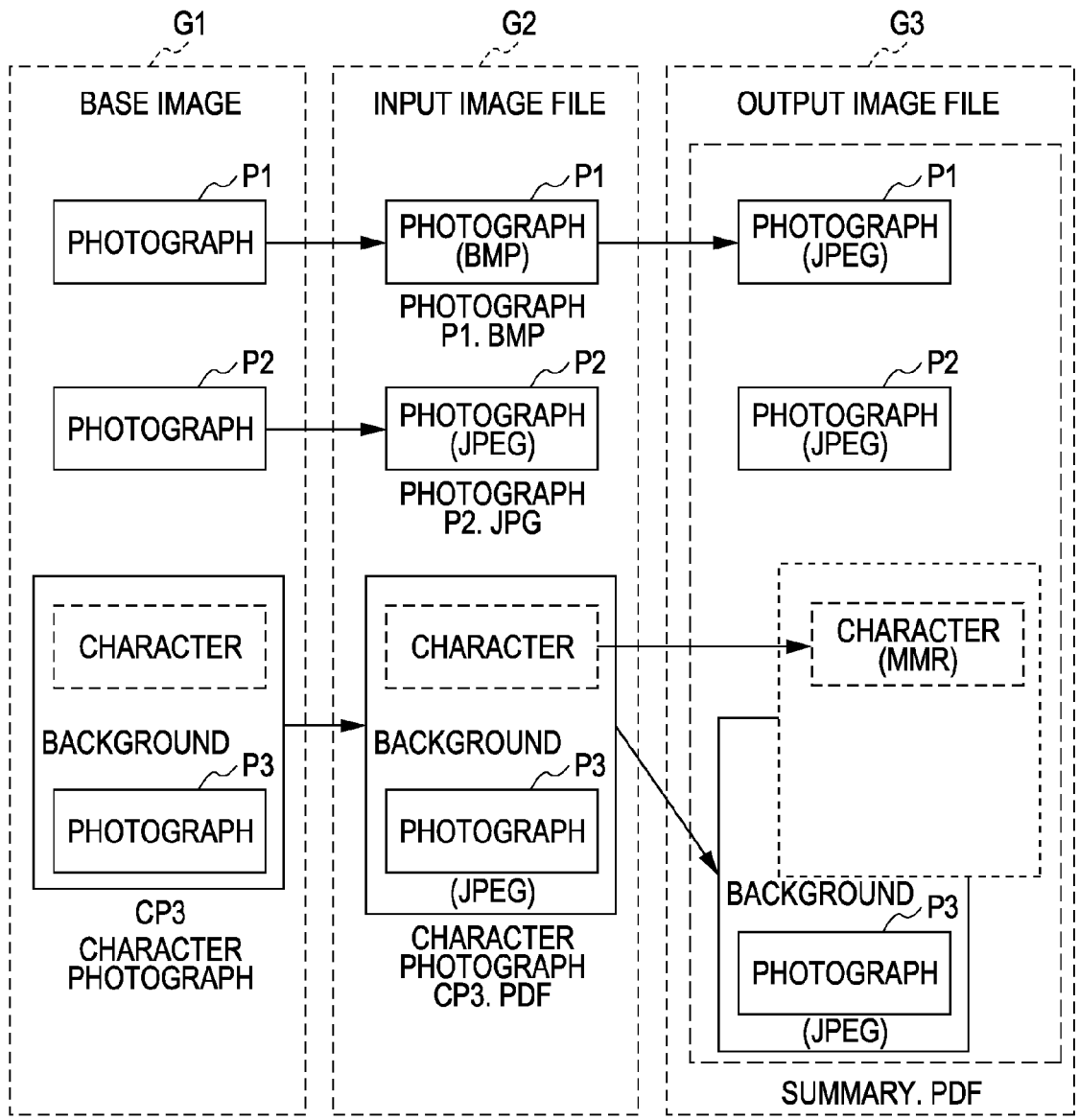
FIG. 9 is a diagram describing a feature of the exemplary embodiment.

FIG. 9 is a diagram describing a feature of the exemplary embodiment described above.

In FIG. 9, an image G1 on a base document has photographs P1 and P2 and a character photograph CP3. In the image G1, the photograph P1 is an uncompressed photograph and the photograph P2 is a photograph compressed using the first compression format. Further, the character photograph CP3 has entirely been compressed using the first compression format. The current state of the image G1 is described in an input image file G2 illustrated in FIG. 9. In this state, the photograph P1 is compressed using the first compression format and the character region in the character photograph CP3 is compressed using the second compression format, or re-compressed. A resulting image file is illustrated as an output image file G3 in FIG. 9.

In FIG. 9, compression formats are enclosed in parentheses, and each file has a file name therebelow with an extension indicating a file format. In this regard, the first compression format may be the JPEG compression format and the second compression format may be the MMR compression format. The file with "CHARACTER PHOTOGRAPH CP3.PDF" is a normal PDF file and has entirely been JPEG compressed. An image located at the bottom of the file with "SUMMARY.PDF" is a high-compressed PDF image. The character image region is MMR compressed, which is supported in a layer different from that of the JPEG compression applied to the photographs and background.

In the example illustrated in FIG. 9, the first compression format may be used for the character region and the second compression format may be used for the background region. Conversely, the first compression format may be used for the background region and the second compression format may be used for the character region.

Further, the input, analysis, determination, compression, and output units may be replaced by input, analysis, determination, compression, and output steps, respectively, and a program for performing those steps may be executed by an editing apparatus.

According to the exemplary embodiment described above, in a page editing operation for combining a plurality of single-page or multipage image files to create a multipage image file, a user can easily recognize the compression setting of images.

In the exemplary embodiment described above, further, a page in which a character region and a background region are separated from each other and are not composed of image objects having different compression formats is automatically separated into a character region and a background region and is reconstructed using image objects having different image depths, resolutions, and compression formats. According to the exemplary embodiment described above, therefore, the file size can be optimized.

While in the exemplary embodiment described above, the implementation of an application on a personal computer (PC) has been explained, a multifunction peripheral including a CPU, a storage device, an image reading device such as a scanner, and a printer and capable of executing editing of image files without using a PC can be used.

According to the exemplary embodiment described above, the convenience of the operation of combining a multipage image file, once created, with another multipage image file can be significantly improved, and the convenience of a page editing operation such as rearranging pages or inserting or deleting a page can be significantly improved.

According to the exemplary embodiment described above, furthermore, when image files are combined or edited, an image file in which a character region and a background region are separated from each other and are not composed of image objects having different compression formats is automatically separated into a character region and a background region. Then, the image files are reconstructed using image objects having different compression formats. According to the exemplary embodiment described above, therefore, the file size of an image file created by combining image files can be prevented from being too large.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-095330 filed Apr. 1, 2008, which is hereby incorporated by reference herein in its entirety.

What is claimed is:

1. A method comprising:
a display step of causing a display device to display a plurality of thumbnail images corresponding to a plurality of images with display items for emphasizing one or more first thumbnail images corresponding to one or more images which have been compressed with a high-compressed PDF, so that each of the display items is added to corresponding one of the first thumbnails and the one or more first thumbnail images are more emphasized than one or more second thumbnail images corresponding to one or more remaining images which have not been compressed with the high-compressed PDF, wherein each of the display items indicates the high-compressed PDF;
a selecting step of selecting one or more thumbnail images from the plurality of thumbnail images, in accordance with an instruction from a user; and
a generating step of generating a file which includes one or more images corresponding to the one or more thumbnail images selected in the selecting step and corresponds to a high-compressed PDF, by compressing, using a predetermined compression method of the high-compressed PDF, the one or more images which corresponds to the one or more thumbnail images selected in the selecting step and has not been compressed with the high-compressed PDF.

2. The method according to claim 1, further comprising a specifying step of specifying an image which can be compressed using the high-compressed PDF,
wherein the generating step compresses the image specified in the specifying step using the high-compressed PDF.

3. The method according to claim 2, wherein an image including a first image region and a second image region that are configured as different layers, is compressed in the generating step with the high-compressed PDF, so that the first image region and the second image region are compressed with different compression methods, and
wherein in the specifying step, it is determined whether each of the plurality of images has a layered structure.

4. The method according to claim 3, wherein the first image region is a background region, and the second image region is a character region, and
wherein the specifying step includes a step of performing an analysis as to whether each of the plurality of images includes a character region.

5. The method according to claim 2, wherein the specifying step includes a step of performing an analysis as to whether each of the plurality of images has text data added thereto, and
wherein the method further comprises an addition step of performing character recognition on an image having no text data added thereto and adding text data to the image.

6. The method according to claim 5, wherein the display step causes the display device to display the list, so that one or more thumbnail images corresponding to one or more images to which text data has been added are further emphasized.

7. The method according to claim 1, further comprising an editing step of editing the plurality of images, wherein the editing in the editing step includes deletion of an image, addition of an image, or rearrangement of image.

8. The method according to claim 1, wherein the file generated in the generating step can include one or more images compressed by using the predetermined compression method and one or more images which are not compressed by using the predetermined compression.

9. The method according to claim 1, wherein each of the plurality of images is included in corresponding one of a plurality of image files, and the display step causes the display device to display the plurality of thumbnail images each of which is based on data included in corresponding one of the plurality of image files.

10. The method according to claim 1, wherein, in the high-compressed PDF, an image is compressed by using the predetermined compression method in which a first region in the image is compressed by a first compression process and a second region in the image is compressed by a second compression process.

11. The method according to claim 10, wherein the first region is a character region and the second region is a background region.

12. The method according to claim 1, wherein the generating step further compresses one or more remaining images which cannot be compressed by using the predetermined compression method, using another compression format different from the compression format.

13. The method according to claim 1, wherein the display step causes the display device to display a list of the plurality of thumbnail images and adds the display items to the one or more first thumbnail images.

14. The method according to claim 1, wherein if the one or more thumbnail images corresponding to the one or more images that have been compressed with a high-compressed PDF are selected in the selecting step, the generating step does not compress the one or more images.

15. An apparatus comprising:
a display control unit configured to cause a display device to display a plurality of thumbnail images corresponding to a plurality of images with display items for emphasizing one or more first thumbnail images corresponding to one or more images which have been compressed with a high-compressed PDF, so that each of the display items is added to corresponding one of the first thumbnail images and the one or more first thumbnail images are more emphasized than one or more second thumbnail images corresponding to one or more remaining images which have not been compressed with the high-compressed PDF, wherein each of the display items indicates the high-compressed PDF;

a selecting unit configured to select one or more thumbnail images from the plurality of thumbnail images, in accordance with an instruction from a user; and a generating unit configured to generate a file which includes one or more images corresponding to the one or more thumbnail images selected in the selecting unit and corresponds to a high-compressed PDF, by compressing, using a predetermined compression method of the high-compressed PDF, the one or more images which corresponds to the one or more thumbnail images selected in the selecting unit and has not been compressed with the high-compressed PDF.

16. A non-transitory computer-readable medium that stores a program, the program being executed by a computer, the program comprising:

a display step of causing a display device to display a plurality of thumbnail images corresponding to a plurality of images with display items for emphasizing one or more first thumbnail images corresponding to one or more images which have been compressed with a high-compressed PDF, so that each of the display items is added to corresponding one of the first thumbnail images and the one or more first thumbnail images are more emphasized than one or more second thumbnail images corresponding to one or more remaining images which have not been compressed with the high-compressed PDF, wherein each of the display items indicates the high-compressed PDF;

a selecting step of selecting one or more thumbnail images from the plurality of thumbnail images, in accordance with an instruction from a user; and a generating step of generating a file which includes one or more images corresponding to the one or more thumbnail images selected in the selecting step and corresponds to a high-compressed PDF, by compressing, using a predetermined compression method of the high-compressed PDF, the one or more images which corresponds to the one or more thumbnail images selected in the selecting step and has not been compressed with the high-compressed PDF.

17. The non-transitory computer-readable medium according to claim 16, further comprising a specifying step of specifying an image which can be compressed using the high-compressed PDF, wherein the generating step comprises the image specified in the specifying step using the high-compressed PDF.

18. The non-transitory computer-readable medium according to claim 17, wherein an image including a first image region and a second image region that are configured as different layers, is compressed in the generating step with the high-compressed PDF, so that the first image region and the second image region are compressed with different compression methods, and wherein in the specifying step, it is determined whether each of the plurality of images has a layered structure.

19. The non-transitory computer-readable medium according to claim 18, wherein the first image region is a background region, and the second image region is a character region, and wherein the specifying step includes a step of performing an analysis as to whether each of the plurality of images includes a character region.

20. The non-transitory computer-readable medium according to claim 17, wherein the specifying step includes a step of performing an analysis as to whether each of the plurality of images has text data added thereto, and wherein the method further comprises an addition step of performing character recognition on an image having no text data added thereto and adding text data to the image.

* * * * *